(12) United States Patent  
Attala

(10) Patent No.: US 9,981,585 B2  
(45) Date of Patent: May 29, 2018

(54) VERTICALLY DEPLOYABLE ACTUATING VEHICLE ARMREST

(71) Applicant: Ford Global Technologies, LLC, Dearborn, MI (US)

(72) Inventor: Jeffrey Michael Attala, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/213,764

(22) Filed: Jul. 19, 2016

(65) Prior Publication Data

US 2018/0022247 A1   Jan. 25, 2018

(51) Int. Cl.
*B60N 2/75* (2018.01)

(52) U.S. Cl.
CPC ............. *B60N 2/763* (2018.02); *B60N 2/753* (2018.02); *B60N 2/79* (2018.02)

(58) Field of Classification Search
CPC .... B60N 2/468; B60N 2/4606; B60N 2/4626; B60N 2/753; B60N 2/763; B60N 2/79
USPC .................................................... 297/188.15
See application file for complete search history.

(56) References Cited

U.S. PATENT DOCUMENTS

| | | | |
|---|---|---|---|
| 5,271,661 A * | 12/1993 | Gould | B60N 2/4686 297/188.15 |
| 5,897,089 A | 4/1999 | Lancaster et al. | |
| 6,719,343 B2 | 4/2004 | Emerling et al. | |
| 6,929,304 B1 | 8/2005 | Dry et al. | |
| 7,114,774 B2 * | 10/2006 | Stahel | A47C 7/68 297/188.15 X |
| 7,131,690 B2 | 11/2006 | Bollaender et al. | |
| 7,192,070 B2 | 3/2007 | Radu et al. | |
| 7,631,931 B2 * | 12/2009 | Langensiepen | B60N 2/4613 297/188.15 |
| 8,540,310 B2 | 9/2013 | Suhre | |
| 9,050,910 B2 | 6/2015 | Kim | |

* cited by examiner

*Primary Examiner* — Anthony D Barfield
(74) *Attorney, Agent, or Firm* — Vichit Chea; Price Heneveld LLP

(57) ABSTRACT

A vehicle armrest includes a top member having a cushion and defining an upper surface. A bottom member is rotationally coupled to a bottom portion of the top member. The bottom member is operable between a stowed position where a top surface of the bottom member engages a bottom surface of the top member, and a deployed position where the bottom member rotates downward and shifts forward to define a lower accessory surface.

18 Claims, 7 Drawing Sheets

US 9,981,585 B2

VERTICALLY DEPLOYABLE ACTUATING VEHICLE ARMREST

FIELD OF THE INVENTION

The present invention generally relates to vehicle armrests, and more specifically, a vertically deployable vehicle armrest with an actuating assembly.

BACKGROUND OF THE INVENTION

Various automobile seating positions within a passenger cabin include armrests that may have various additional accessory functions, such as cupholders, containers, and other similar accessory structures. These accessories can either be built into the surface of the armrest, or can be deployed or accessed through various doors or operable panels.

SUMMARY OF THE INVENTION

According to one aspect of the present invention, a vehicle armrest includes a top member having a cushion and defining an upper surface. A bottom member is rotationally coupled to a bottom portion of the top member. The bottom member is operable between a stowed position where a top surface of the bottom member engages a bottom surface of the top member, and a deployed position where the bottom member rotates downward and shifts forward to define a lower accessory surface.

According to another aspect of the present invention, a vehicle includes an armrest top member coupled proximate an interior vehicle panel. An armrest bottom portion is below the top member and operable between stowed and deployed positions. The bottom portion remains parallel with the top member as the bottom member operates between the stowed and deployed positions, and wherein the top member is rotationally operable relative to the interior vehicle panel.

According to another aspect of the present invention, a vehicle armrest includes a top member having a cushion and rotationally operable about a pivot. A bottom member is connected to the top member via a closed-chain linkage and operable relative to the top member between stowed and deployed positions. A cupholder is defined at least within the bottom member, wherein the cupholder is only accessible with the bottom member in the deployed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
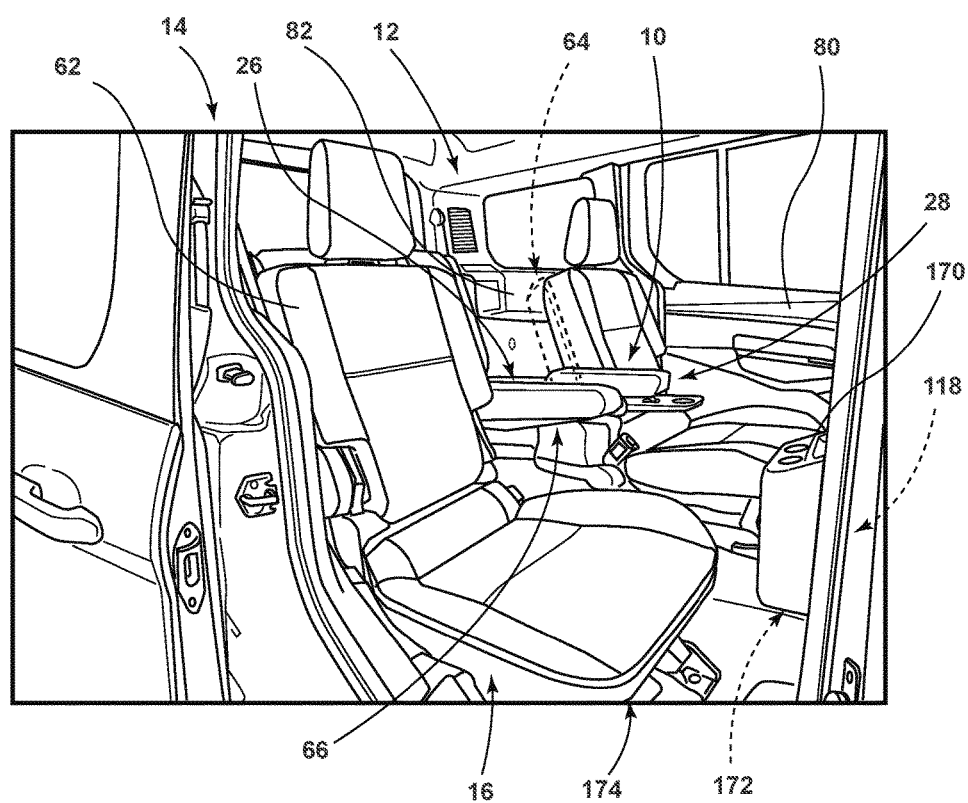
FIG. 1 is a side perspective view of a passenger cabin of a vehicle having armrests that incorporate an aspect of the vertically deployable vehicle armrest.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
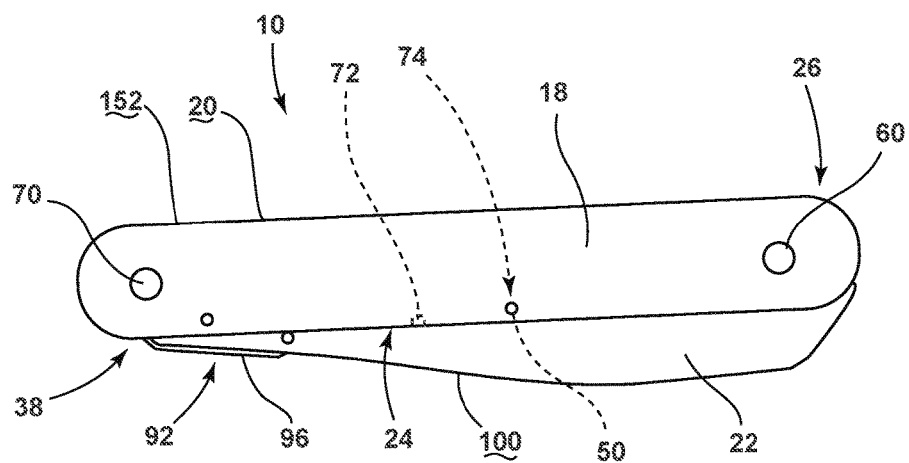
FIG. 2 is a side elevational view of an aspect of a vertically deployable vehicle armrest shown in a stowed position.
Figure 3:
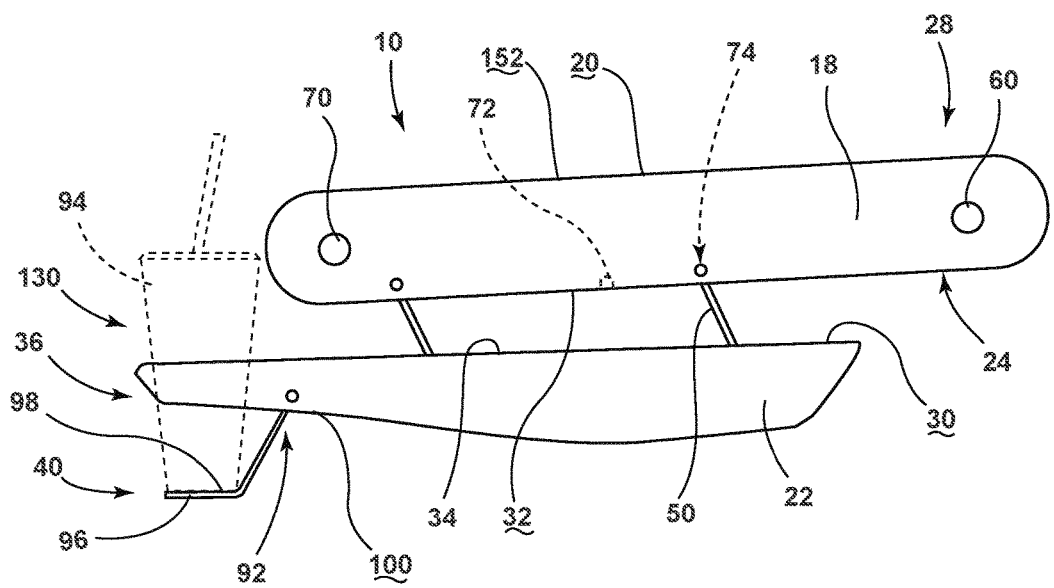
FIG. 3 is a side elevational view of the vertically deployable armrest of FIG. 2 shown in a deployed position.
Figure 4:
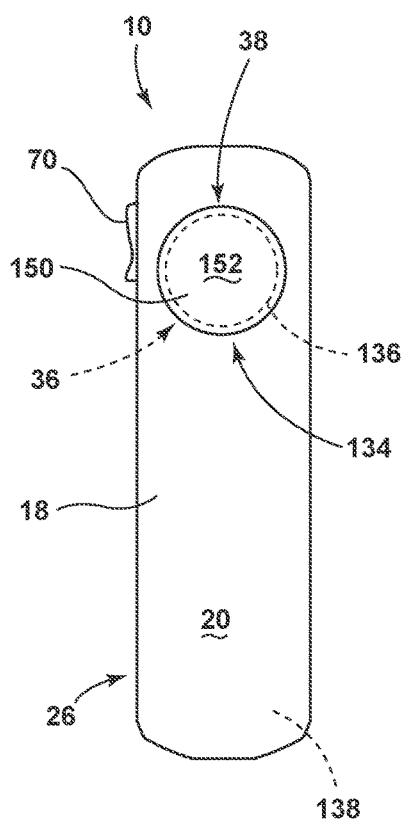
FIG. 4 is a top plan view of an aspect of the vertically deployable armrest shown in a stowed position and having a cupholder receptacle in an inaccessible state.
Figure 5:
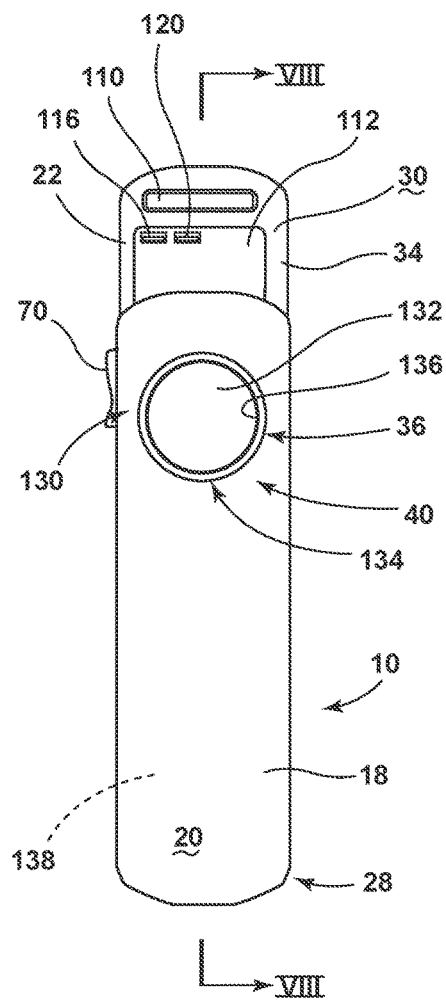
FIG. 5 is a top plan view of the vertically deployable armrest of FIG. 4 shown in the deployed position and showing the cupholder in a use state.
Figure 6:
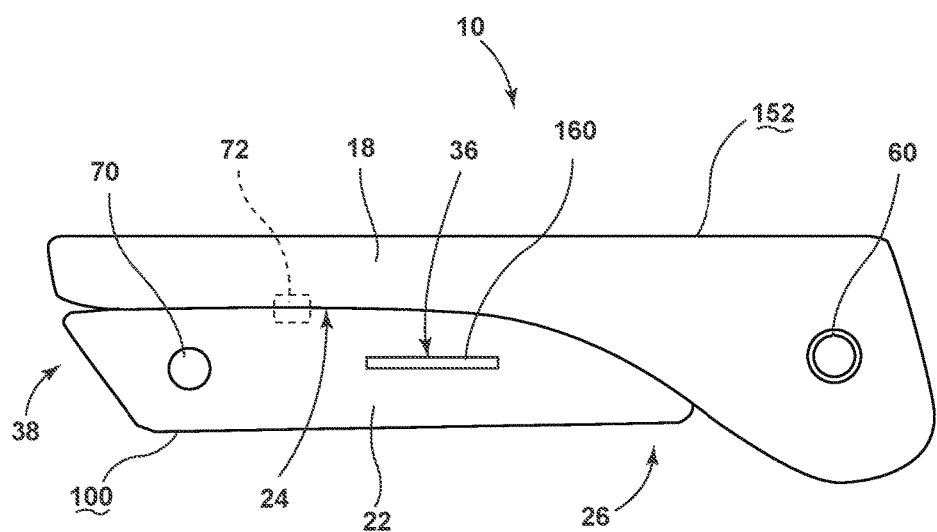
FIG. 6 is a side elevational view of an aspect of the vertically deployable armrest shown in a stowed position.
Figure 7:
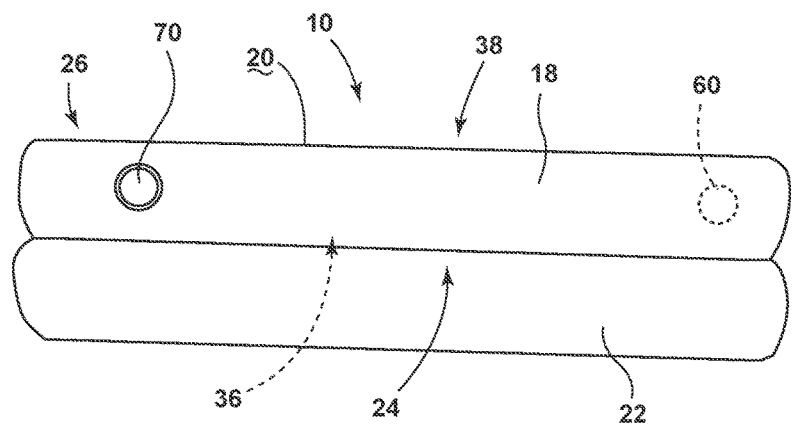
FIG. 7 is a side elevational view of an aspect of the vertically deployable armrest shown in a stowed position.
Figure 8:
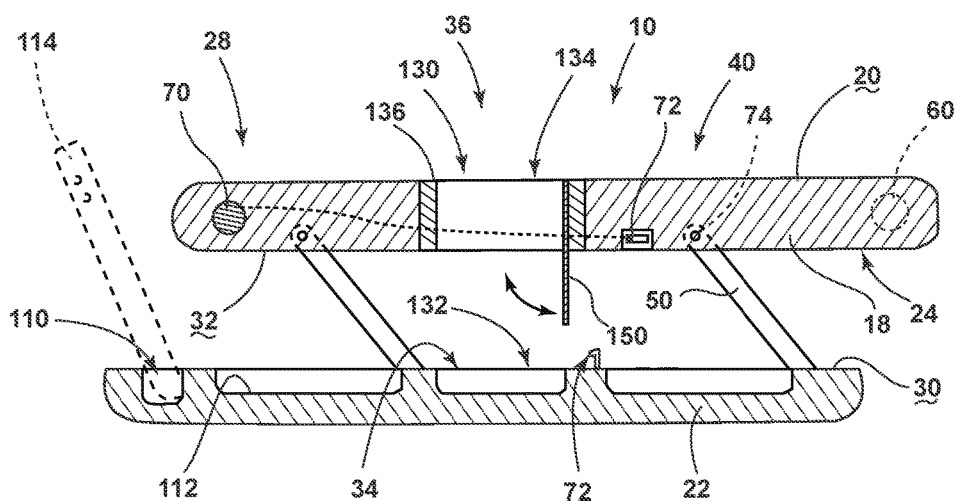
FIG. 8 is a cross-sectional view of the vertically deployable armrest of FIG. 5 taken along line VIII-VIII and shown in the deployed position.

As shown in FIGS. 1-3, reference numeral 10 generally refers to a vertically deployable armrest disposed within a passenger cabin 12 of a vehicle 14 and situated proximate various seating positions 16 within the passenger cabin 12. The vertically deployable armrest 10 includes a top member 18 having a cushion 138 (shown in FIGS. 4 and 5) and defining an upper surface 20. A bottom member 22 of the vertically deployable armrest 10 is rotationally coupled to a bottom portion 24 of the top member 18. The bottom member 22 is selectively operable between stowed and deployed positions 26, 28. The stowed position 26 of the bottom member 22 is defined by a top surface 30 of the bottom member 22 engaging, or being disposed proximate, a bottom surface 32 of the top member 18. The deployed position 28 of the bottom member 22 is defined by the bottom member 22 rotating downward and shifting forward to define a lower accessory surface 34 at least partially defined with the top surface 30 of the bottom member 22.

Referring now to FIGS. 2-8 illustrating various aspects of the vertically deployable armrest 10, the vertically deployable armrest 10 can include an operable cupholder 36, wherein the operable cupholder 36 defines an inaccessible state 38 when the bottom member 22 is in the stowed position 26 and a use state 40 when the bottom member 22 is in the deployed position 28. It is contemplated that the operable cupholder 36 can be disposed within the top member 18 of the vertically deployable armrest 10 or the bottom member 22 of the vertically deployable armrest 10. It is also contemplated that the operable cupholder 36 can be defined by both the top and bottom members 18, 22 of the vertically deployable armrest 10 when the vertically deployable armrest 10 is in the deployed position 28. The various configurations of the operable cupholder 36 will be described more fully below.

Referring again to FIGS. 2-8, the bottom member 22 of the vertically deployable armrest 10 is coupled to the top member 18 through a linkage 50 that defines a continuous parallel relationship between the top and bottom members 18, 22 as the bottom member 22 operates between the stowed and deployed positions 26, 28. In this manner, the top and bottom members 18, 22 are positioned parallel with one another when in the stowed position 26. As the bottom member 22 rotates downward and shifts forward to define the lower accessory surface 34, the bottom member 22 remains parallel with the top member 18. To achieve this continuously parallel configuration, the vertically deployable armrest 10 can include a four-bar linkage 50 that extends between the top and bottom members 18, 22. The use of the four-bar linkage 50, or similar mechanism, sometimes referred to as a closed-chain linkage 50, allows for this continually parallel motion of the bottom member 22 with respect to the top member 18.

According to various embodiments, it is contemplated that as the bottom member 22 rotates downward and translates forward with respect to the top member 18, the bottom member 22 may be in a non-parallel configuration with respect to the top member 18. In such a configuration, it is contemplated that one of the members of the linkage 50 between the bottom member 22 and the top member 18 may be longer than the other members of the linkage 50. In such an embodiment, it is contemplated that one of the stowed and deployed positions 26, 28 of the vertically deployable armrest 10 may define a non-parallel configuration between the bottom member 22 and the top member 18. In such an embodiment, the other of the stowed and deployed positions 26, 28 may define a parallel configuration. Through the use of the linkage 50 having members of different lengths, the bottom member 22, as it rotates downward and translates forward to the deployed position 28, may be moved into a parallel or non-parallel configuration with the top member 18 when it is in the deployed position 28. In this embodiment, it is contemplated that the bottom member 22 may remain non-parallel with the top member 18 until such time as it reaches one of the deployed or stowed positions 28, 26.

Referring again to FIGS. 1-8, it is contemplated that the vertically deployable armrest 10 can include a pivot 60 within a top portion that allows for rotation of the vertically deployable armrest 10 about the pivot 60. Accordingly, the vertically deployable armrest 10 may be rotated upward such that an occupant of the particular seating position 16 can move the vertically deployable armrest 10 to be parallel with a seatback 62 of the seating position 16. According to the various embodiments, it is contemplated that operation of the vertically deployable armrest 10 about the pivot 60 may automatically move the vertically deployable armrest 10 in the deployed position 28 to the stowed position 26 as the vertically deployable armrest 10 is rotated upward about the pivot 60. In this manner, the pivot 60 may be placed in communication with the linkage 50 extending between the top and bottom members 18, 22. It is also contemplated, in various embodiments, that the bottom member 22 may be automatically moved to the deployed position 28 when the vertically deployable armrest 10 is rotated about the pivot 60 from a vertical position 64 substantially in alignment with the seatback 62 to a lateral position 66 for use by the occupant of the vehicle seat.

Referring again to FIGS. 2-8, it is contemplated that the vertically deployable armrest 10 can include an actuator 70 placed in communication with the linkage 50 extending between the top and bottom members 18, 22. The actuator 70 can be disposed within the top member 18, the bottom member 22, or both. The actuator 70 can serve to release the bottom member 22 from engagement with the top member 18 that defines the stowed position 26 such that the bottom member 22 can be rotated downward and translated forward to define the deployed position 28 of the vertically deployable armrest 10. In such an embodiment, it is contemplated that the actuator 70 can be a release button that is attached to an internal latch 72. The internal latch 72 can receive the bottom member 22 in the stowed position 26 and retain the bottom member 22 in the stowed position 26 until such time as the actuator 70 is manipulated to move the bottom member 22 to the deployed position 28. It is contemplated that the internal latch 72 can be operated in conjunction with a biasing mechanism 74 that biases the bottom member 22 toward the deployed position 28, such that when the actuator 70 is engaged, the latch 72 is released and the bottom member 22, through operation of the biasing mechanism 74, is biased toward and selectively held in the deployed position 28. It is also contemplated that the bottom member 22 can be operated between the stowed and deployed positions 26, 28 through use of various operating mechanisms that can include, but are not limited to, motors, pneumatic mechanisms, hydraulic mechanisms, other biasing mechanisms 74, combinations thereof, and other similar mechanisms that can be used to operate the bottom member 22 between the stowed and deployed positions 26, 28. Accordingly, it is contemplated that the bottom member 22 can be moved from the deployed position 28 and back to the stowed position 26, either manually or through the use of mechanisms similar to those described above.

Referring again to FIGS. 1-8, it is contemplated that the vertically deployable armrest 10 can be coupled to various portions of the vehicle 14 proximate dedicated seating positions 16 that the vertically deployable armrest 10 is intended to serve. Within each of these seating positions 16, the vertically deployable armrest 10 can be coupled with an interior door panel 80, or an interior wall panel 82, or can be coupled to a portion of a seatback 62 for the seating position 16. Where the vertically deployable armrest 10 includes a pivot 60, the pivot 60 can extend from the door panel 80, wall panel 82, seatback 62, or other portion of the vehicle 14 and extend at least partially through the top member 18 for allowing rotation of the top member 18, and in turn, the entire vertically deployable armrest 10 about the pivot 60. Typically, where the vertically deployable armrest 10 is attached to a door panel 80 or interior wall panel 82 of the vehicle 14, no pivot 60 will be included. In such an embodiment, the top member 18 of the vertically deployable armrest 10 may be incorporated within the door panel 80 or interior wall panel 82. Conversely, where the vertically deployable armrest 10 is attached to a seatback 62 of the vehicle seat, the pivot 60 can extend from a portion of the seatback 62 and through the top member 18 of the vertically deployable armrest 10. In this manner, the vertically deployable armrest 10 can be rotatable around the pivot 60 to move the vertically deployable armrest 10 out of the user's way to a vertical position 64 so that the user may have lateral egress into and out of the particular seating position 16.

Referring now to FIGS. 2-11, the vertically deployable armrest 10 can include the operable cupholder 36 within the top member 18, the bottom member 22, or defined within both the top and bottom member 18, 22. According to the various embodiments, as exemplified in FIGS. 2 and 3, the operable cupholder 36 can be positioned in the bottom member 22. In such an embodiment, the operable cupholder 36 is defined within a top surface 30 or lower accessory surface 34 of the bottom member 22, such as a lower aperture defined within or through the bottom member 22 for receiving a cup or other container 94 and securing the cup or other container 94 within the operable cupholder 36. It is contemplated that the operable cupholder 36 can be defined within a forward portion 92 of the bottom member 22, such that when the bottom member 22 rotates downward and translates forward to define the deployed position 28, the operable cupholder 36 is positioned in front of the top member 18, such that the cup or other container 94 can be placed within the operable cupholder 36 without interference from the top member 18.

Referring again to FIGS. 2 and 3, it is contemplated that where the operable cupholder 36 is defined within the forward portion 92 of the bottom member 22 of the vertically deployable armrest 10, the forward portion 92 can include a container supporting member 96 that rotates downward from the forward portion 92 of the bottom member 22. In this manner, the container supporting member 96 can provide a bottom area 98 onto which a container 94 can be supported, especially where the container 94 may be smaller than the lower aperture defined within the forward portion 92 of the bottom member 22. The container supporting member 96 can rotate upward into substantially flush engagement with an underneath surface 100 of the bottom member 22 to be substantially concealed when not in use, such as when the bottom member 22 is disposed in the stowed position 26.

Referring now to FIGS. 3-10, the forward portion 92 of the bottom member 22 can include at least one accessory receptacle 110 defined within the top surface 30, or lower accessory surface 34, of the bottom member 22. Such accessory receptacles 110 can include, but are not limited to, a pocket, recessed portion 112, sloped portion, enclosable recess, combinations thereof, or other similar accessory receptacle 110. At least one of the accessory receptacles can partially define a portion of the operable cupholder 36 within the bottom member 22. It is contemplated that at least one of the accessory receptacles 110 can include various electrical/data functions for connecting a smart phone, tablet, or other portable electronic device 114. It is also contemplated that each of these accessory receptacles 110 is accessible, typically, only when the bottom member 22 is in the deployed position 28 to expose the lower accessory surface 34. Again, at least one of the accessory receptacles 110 can include a recessed portion 112 or area having at least one electrical port 116 in communication with an electrical system 118 of the vehicle 14. As discussed above, the electrical ports 116 disposed within the recess area of the accessory receptacle 110 can include universal serial bus (USB) ports 120, electrical outlets, data ports, ear phone jacks, cigarette lighters, and other similar accessory components.

Referring again to FIGS. 4-8, it is contemplated that the top surface 30 of the bottom member 22 can include a cupholder receptacle 130, wherein the cupholder receptacle 130 defines at least a portion of the operable cupholder 36. As exemplified in FIGS. 4-8, the bottom member 22 includes a lower portion 132 of the operable cupholder 36 that is usable when the bottom member 22 is in the deployed position 28. As discussed above, the cupholder receptacle 130, and in turn, the operable cupholder 36, is in an inaccessible state 38 when the bottom member 22 is in the stowed position 26. According to the various embodiments, it is also contemplated that the top member 18 can include an upper portion 134 of the operable cupholder 36 to further define the cupholder receptacle 130, wherein the upper portion 134 of the cupholder cooperates with an upper aperture 136 that is selectively defined within the top member 18. Accordingly, the upper aperture 136 selectively extends through an upper surface 20 and cushion 138 of the top member 18 only when the bottom member 22 is moved to the deployed position 28. Additionally, the cupholder receptacle 130 that defines the operable cupholder 36 is defined by an alignment between the upper aperture 136 and the lower portion 132 of the cupholder when the bottom member 22 is in the deployed state. In this manner, when a container 94 is disposed within the operable cupholder 36, the container 94 can be disposed through the top portion of the operable cupholder 36 defined within the top member 18 and into the lower portion 132 of the operable cupholder 36 defined within the bottom member 22. When the bottom member 22 is moved to the stowed position 26, the upper and lower portions 134, 132 of the operable cupholder 36 are moved out of alignment, such that the operable cupholder 36 is in an inaccessible state 38.

Referring again to FIGS. 3-8, a filler member 150 can be positioned proximate the upper aperture 136, where the filler member 150 occupies the upper aperture 136 when the bottom member 22 is in the stowed position 26. It is contemplated that the filler member 150 is coplanar with the upper surface 20 of the top member 18 when the bottom member 22 is in the stowed position 26. In this manner, the filler member 150 and the upper surface 20 of the top member 18 define a continuous upper armrest surface 152 when the bottom member 22 is in the stowed position 26. The filler member 150 can extend upward from the bottom portion 24 to occupy the upper aperture 136 when the bottom member 22 is in the stowed position 26. It is also contemplated that the filler member 150 can rotate within the upper aperture 136 as the bottom member 22 operates between the stowed and deployed positions 26, 28. It is further contemplated that other movements of the filler member 150 can be incorporated such that when the bottom member 22 is in the stowed position 26, the filler member 150 cooperates with the upper surface 20 of the top member 18 to define the continuous upper armrest surface 152, and also move to allow access to the upper aperture 136 when the bottom member 22 is moved to the deployed position 28.

Figure 9:
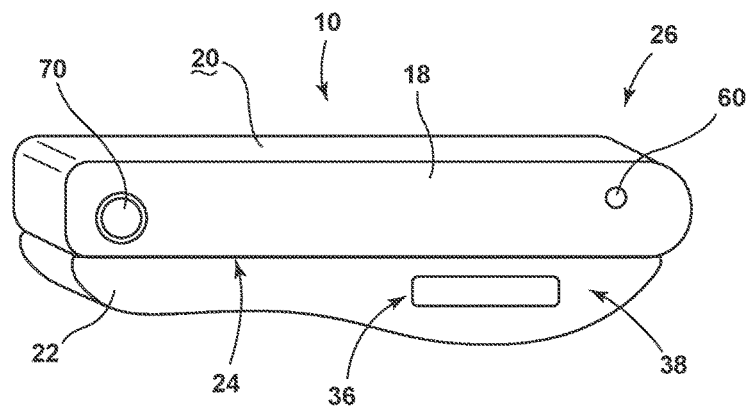
FIG. 9 is a side perspective view of an aspect of the vertically deployable armrest shown in the stowed position.
Figure 10:
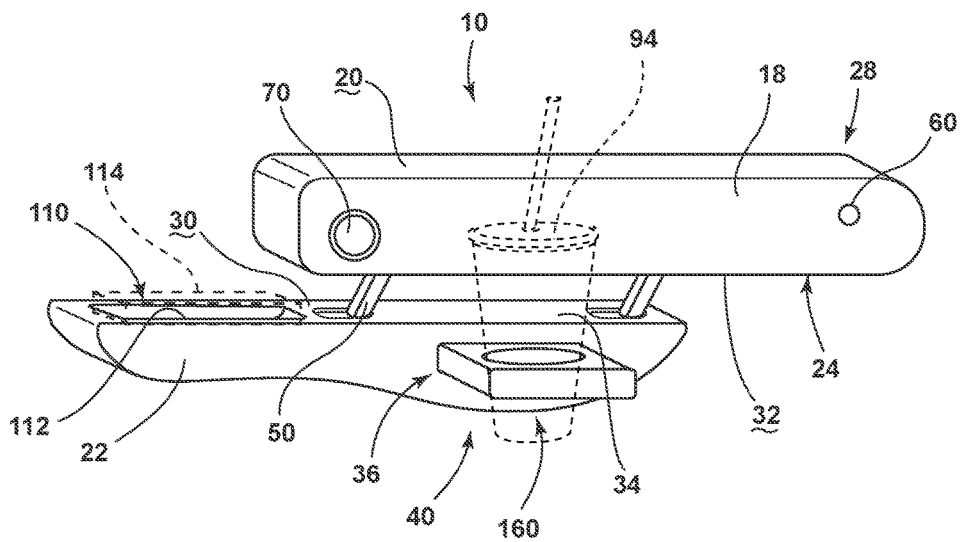
FIG. 10 is a side perspective view of the vertically deployable armrest of FIG. 9 shown in the deployed position and having a laterally deployable cupholder shown in an extended position.
Figure 11:
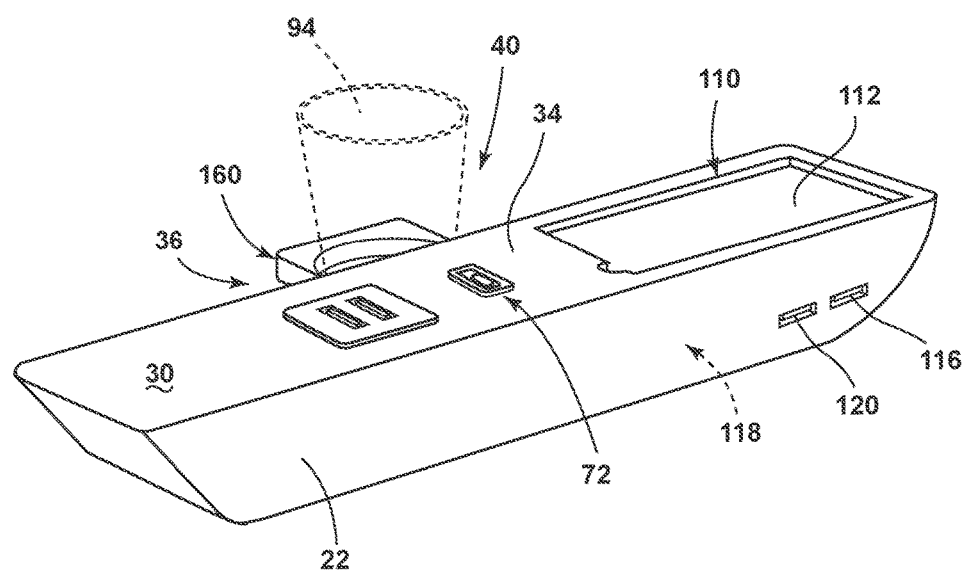
FIG. 11 is a top perspective view of an aspect of a bottom member of the vertically deployable armrest.

Referring now to FIGS. 9-11, it is contemplated that the operable cupholder 36 can be defined within a laterally extending portion defined within the bottom member 22 of the vertically deployable armrest 10. In such an embodiment, the laterally deployable cupholder 160 can extend laterally from the bottom member 22 to define the operable cupholder 36 to a side of the vertically deployable armrest 10. It is contemplated that the laterally deployable cupholder 160 may only be accessible when the vertically deployable armrest 10 is in the deployed position 28. However, operation of the laterally deployable cupholder 160 in the stowed position 26 is also contemplated. The operable cupholder 36 is adapted to extend laterally from the bottom member 22 in a direction perpendicular to the motion of the top surface 30 of the bottom member 22.

Referring again to FIGS. 1-11, the vehicle 14 that includes the vertically deployable armrest 10 can include an armrest top member 18 that is coupled proximate the interior vehicle panel. As discussed above, the interior vehicle panel can be an inner door panel 80, an inner wall panel 82, a side panel of the seating position 16, a portion of the seatback 62, or other similar surface of the passenger cabin 12 of the vehicle 14 that typically includes an armrest. It is also contemplated that the vertically deployable armrest 10 can be disposed within a center console 170, or rotationally operable armrest defined within a front row 172 of seating within the passenger cabin 12, or one of the rear rows 174 of vehicle seating within the passenger cabin 12. The vertically deployable armrest 10 can include an armrest bottom portion 24 disposed below the top member 18 and operable between the stowed and deployed positions 26, 28. It is contemplated that the bottom portion 24 is adapted to remain parallel, or substantially parallel, to the top member 18 as the bottom member 22 operates between the stowed and deployed positions 26, 28. It is also contemplated that the top member 18 is rotationally operable relative to the interior vehicle panel.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle armrest comprising:
    a top member having a cushion and defining an upper surface, wherein the top member is rotationally coupled to a pivot extending at least partially through the top member; and
    a bottom member rotationally coupled to a bottom portion of the top member, the bottom member operable between a stowed position where a top surface of the bottom member engages a bottom surface of the top member, and a deployed position where the bottom member rotates downward and shifts forward to define a lower accessory surface.

2. The vehicle armrest of claim 1, wherein the top member includes an operable cupholder, wherein the operable cupholder defines an inaccessible state when the bottom member is in the stowed position and a use state when the bottom member is in the deployed position.

3. The vehicle armrest of claim 2, wherein the inaccessible state is defined by the upper surface of the top member having a continuous upper armrest surface.

4. The vehicle armrest of claim 2, wherein the top surface of the bottom member includes a cupholder receptacle, wherein the cupholder receptacle defines a lower portion of the operable cupholder when the bottom member is in the deployed position, and wherein the cupholder receptacle is inaccessible when the bottom member is in the stowed position.

5. The vehicle armrest of claim 4, wherein the cupholder receptacle cooperates with an upper aperture selectively defined within the top member.

6. The vehicle armrest of claim 1, wherein the bottom member is coupled to the top member through a linkage that defines a continuous parallel relationship between the top and bottom members as the bottom member operates between the stowed and deployed positions.

7. The vehicle armrest of claim 6, where the linkage is a four-bar linkage.

8. The vehicle armrest of claim 1, further comprising:
    an operable cupholder positioned in the bottom member, wherein the operable cupholder extends laterally from the bottom member in a direction perpendicular to a motion of the top surface of the bottom member.

9. A vehicle comprising:
    an armrest top member coupled proximate an interior vehicle panel; and
    an armrest bottom portion below the top member and operable between stowed and deployed positions, wherein the bottom portion remains parallel with the top member as the bottom portion operates between the stowed and deployed positions, and wherein the top member is rotationally operable relative to the interior vehicle panel.

10. The vehicle of claim 9, wherein the interior vehicle panel is a door panel.

11. The vehicle of claim 9, wherein the interior vehicle panel is a side panel of a vehicle seat.

12. The vehicle of claim 9, further comprising:
    a cupholder defined at least within the bottom portion, wherein the cupholder is only accessible with the bottom portion in the deployed position, wherein the cupholder is defined by an upper aperture selectively extending through an upper surface and a cushion of the top member only when the bottom portion is in the deployed position, and wherein the cupholder includes a cupholder receptacle that aligns with the upper aperture in the deployed position.

13. The vehicle of claim 12, further comprising:
    a filler member that occupies the upper aperture when the bottom portion is in the stowed position, wherein the filler member and the upper surface define a continuous upper armrest surface when the bottom portion is in the stowed position.

14. A vehicle armrest comprising:
    a top member having a cushion and being rotationally operable about a pivot;
    a bottom member connected to the top member via a closed-chain linkage and operable relative to the top member between stowed and deployed positions;
    a cupholder defined at least within the bottom member, wherein the cupholder is only accessible with the bottom member in the deployed position; and
    an actuator disposed within the top and bottom members, wherein the actuator includes a latch disposed in at least one of the top and bottom members.

15. The vehicle armrest of claim 14, wherein the cupholder is defined by an upper aperture selectively extending through an upper surface and the cushion of the top member only when the bottom member is in the deployed position, and wherein the cupholder includes a cupholder receptacle that aligns with the upper aperture in the deployed position.

16. The vehicle armrest of claim 15, further comprising:
    a filler member that occupies the upper aperture when the bottom member is in the stowed position, wherein the filler member and the upper surface define a continuous upper armrest surface when the bottom member is in the stowed position.

17. The vehicle armrest of claim 14, wherein a top surface of the bottom member includes at least one accessory receptacle that is accessible only when the bottom member is in the deployed position, wherein the at least one accessory receptacle includes a recess area having at least one electrical port in communication with a vehicle electrical system.

18. The vehicle armrest of claim 14, wherein the actuator is disposed within the top member.

* * * * *